United States Patent
van Zelm et al.

(10) Patent No.: US 11,095,399 B2
(45) Date of Patent: *Aug. 17, 2021

(54) ROBUST TELEMETRY REPEATER NETWORK SYSTEM AND METHOD

(71) Applicant: Baker Hughes Oilfield Operations LLC, Houston, TX (US)

(72) Inventors: John-Peter van Zelm, Calgary (CA); Celine J. Martineau, Houston, TX (US)

(73) Assignee: BAKER HUGHES OILFIELD OPERATIONS LLC, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/862,843

(22) Filed: Apr. 30, 2020

(65) Prior Publication Data

US 2020/0259593 A1 Aug. 13, 2020

Related U.S. Application Data

(60) Division of application No. 16/161,955, filed on Oct. 16, 2018, now Pat. No. 10,673,571, which is a
(Continued)

(51) Int. Cl.
*G08B 21/00* (2006.01)
*H04L 1/16* (2006.01)
(Continued)

(52) U.S. Cl.
CPC ............ *H04L 1/1657* (2013.01); *E21B 47/12* (2013.01); *H04L 43/08* (2013.01);
(Continued)

(58) Field of Classification Search
CPC ... H04L 1/1657; H04L 43/08; H04L 43/0817; H04L 43/0835; H04L 43/0852; E21B 47/12; Y04S 40/00
See application file for complete search history.

(56) References Cited

U.S. PATENT DOCUMENTS

| 5,365,229 A | 11/1994 | Gardner et al. |
| 5,450,616 A * | 9/1995 | Rom ............ H04W 52/60 455/69 |

(Continued)

FOREIGN PATENT DOCUMENTS

| EP | 1978670 A2 | 10/2008 |
| EP | 2466978 A1 | 6/2012 |

(Continued)

OTHER PUBLICATIONS

"DRILCO Rotary Kelly"; Schlumberger Limited; Retrieved Online from http://www.slb.com/services/drilling/tools_services/machining_inspection_tubulars_surface/tubulars_subs/kelly.aspx; 2014; 1 Page.

(Continued)

*Primary Examiner* — Munear T Akki
(74) *Attorney, Agent, or Firm* — Cantor Colburn LLP

(57) ABSTRACT

A robust network telemetry repeater system exploits the repeater structure of data propagation and transmission and reception bi-directionality to increase network robustness. For example, multiple perceived receive attempts are created with no additional overhead. The system can be configured whereby nodes "hear" the transmissions of both adjacent and non-adjacent nodes forming implicit acknowledgement ("Acks"), and originating nodes can retransmit until implicit acknowledgments ("Acks") are "heard," indicating a successful link relay. Implicit acknowledgment can be applied to bidirectional networks, and bidirectional action can enable all nodes in the network to know the status of all other nodes.

10 Claims, 7 Drawing Sheets

Related U.S. Application Data continuation of application No. 14/217,160, filed on Mar. 17, 2014, now Pat. No. 10,103,846.

(60) Provisional application No. 61/799,588, filed on Mar. 15, 2013.

(51) Int. Cl.
*H04L 12/26* (2006.01)
*E21B 47/12* (2012.01)

(52) U.S. Cl.
CPC ...... *H04L 43/0817* (2013.01); *H04L 43/0835* (2013.01); *H04L 43/0852* (2013.01); *Y04S 40/00* (2013.01)

(56) References Cited

U.S. PATENT DOCUMENTS

| | | | |
|---|---|---|---|
| 5,838,727 A | 11/1998 | Lyon et al. | |
| 5,907,491 A * | 5/1999 | Canada | H04B 7/2606 700/108 |
| 6,144,316 A | 11/2000 | Skinner | |
| 6,370,082 B1 | 4/2002 | Gardner et al. | |
| 6,445,307 B1 | 9/2002 | Rassi et al. | |
| 6,714,611 B1 | 3/2004 | Du et al. | |
| 7,324,010 B2 | 1/2008 | Gardner et al. | |
| 7,339,494 B2 | 3/2008 | Shah et al. | |
| 7,477,161 B2 | 1/2009 | MacPherson et al. | |
| 7,480,207 B2 | 1/2009 | Marsh | |
| 7,777,645 B2 | 8/2010 | Shah et al. | |
| 7,913,773 B2 | 3/2011 | Li et al. | |
| 8,040,249 B2 | 10/2011 | Shah et al. | |
| 8,102,784 B1 | 1/2012 | Lemkin et al. | |
| 8,115,651 B2 | 2/2012 | Camwell et al. | |
| 8,164,476 B2 | 4/2012 | Hache et al. | |
| 8,248,266 B2 | 8/2012 | MacPherson et al. | |
| 8,704,677 B2 | 4/2014 | Prammer | |
| 8,902,695 B2 | 12/2014 | Dashevskiy et al. | |
| 10,119,393 B2 * | 11/2018 | Derkacz | E21B 47/13 |
| 2002/0022495 A1 * | 2/2002 | Choi | H04W 52/265 455/522 |
| 2002/0133733 A1 | 9/2002 | Abdel-Ghaffar | |
| 2002/0140572 A1 | 10/2002 | Gardner et al. | |
| 2003/0006906 A1 | 1/2003 | Gardner et al. | |
| 2003/0142586 A1 * | 7/2003 | Shah | E21B 41/0035 367/82 |
| 2004/0085988 A1 | 5/2004 | Gardner et al. | |
| 2005/0035875 A1 | 2/2005 | Hall et al. | |
| 2005/0212530 A1 * | 9/2005 | Hall | G01R 31/52 324/642 |
| 2005/0226214 A1 | 10/2005 | Keslassy et al. | |
| 2005/0270171 A1 | 12/2005 | Quintero et al. | |
| 2006/0114746 A1 | 6/2006 | Gardner et al. | |
| 2006/0145889 A1 * | 7/2006 | Rawle | G01V 11/002 340/853.1 |
| 2006/0168180 A1 * | 7/2006 | Black | H04L 67/32 709/223 |
| 2006/0272859 A1 | 12/2006 | Pastusek et al. | |
| 2007/0091983 A1 * | 4/2007 | Siriwongpairat | H04B 1/719 375/130 |
| 2007/0132846 A1 * | 6/2007 | Broad | G08B 25/009 348/143 |
| 2007/0159321 A1 | 7/2007 | Ogata et al. | |
| 2007/0257809 A1 | 11/2007 | Camwell et al. | |
| 2008/0024318 A1 | 1/2008 | Hall et al. | |
| 2008/0253228 A1 | 10/2008 | Camwell et al. | |
| 2009/0146836 A1 | 6/2009 | Santosa et al. | |
| 2009/0166031 A1 | 7/2009 | Hernandez | |
| 2009/0189777 A1 | 7/2009 | Johnson et al. | |
| 2010/0039286 A1 | 2/2010 | Robbins | |
| 2010/0097890 A1 | 4/2010 | Sullivan et al. | |
| 2010/0150162 A1 | 6/2010 | Nakayama | |
| 2010/0182161 A1 | 6/2010 | Robbins et al. | |
| 2010/0313646 A1 | 12/2010 | Mehta et al. | |
| 2011/0141852 A1 | 6/2011 | Camwell et al. | |
| 2011/0165861 A1 | 7/2011 | Wilson et al. | |
| 2011/0205080 A1 | 8/2011 | Millot et al. | |
| 2011/0247803 A1 | 10/2011 | Rodney et al. | |
| 2012/0037423 A1 | 2/2012 | Geerits et al. | |
| 2012/0126992 A1 | 5/2012 | Rodney et al. | |
| 2012/0126993 A1 | 5/2012 | Samson et al. | |
| 2012/0148237 A1 | 6/2012 | Harrison et al. | |
| 2012/0243454 A1 | 9/2012 | Hwang et al. | |
| 2012/0274477 A1 * | 11/2012 | Prammer | E21B 47/13 340/853.7 |
| 2012/0294112 A1 | 11/2012 | Pearce et al. | |
| 2012/0297070 A1 * | 11/2012 | Shi | H04W 72/1226 709/226 |
| 2013/0038358 A1 | 2/2013 | Cook et al. | |
| 2013/0106615 A1 * | 5/2013 | Prammer | H04L 25/24 340/854.6 |
| 2019/0052410 A1 | 2/2019 | Van Zelm et al. | |

FOREIGN PATENT DOCUMENTS

| | | |
|---|---|---|
| EP | 2972527 B1 | 10/2019 |
| GB | 2423893 B | 9/2006 |
| WO | 2009053954 A1 | 4/2009 |
| WO | 2013162491 A1 | 10/2013 |

OTHER PUBLICATIONS

"Underbalanced Drilling"; Wiki[edia; Retrieved Online from http://en.wikipedia.org/wiki/UnderbalancedDrilling on Jul. 28, 2014; 3 Pages.

Camwell et al.; "Acoustic Telemetry, with Multiple Nodes in Drillstring, Used to Achieve Disributed MWD"; Innovating While Drilling; Drilling Contractor; Mar. / Apr. 2009; pp. 30-35.

Extended European Search Report Issued in European Application No. 14762714.5 / International Application No. PCT/US2014/030682 dated Oct. 14, 2016; 8 Pages.

Extended European Search Report Issued in European Application No. 14764197.1 / International Application No. PCT/US2014/030831 dated Feb. 16, 2017; 15 Pages.

Extended European Search Report Issued in European Application No. 14884471.5 / International Application No. PCT/US2014/021356 dated Oct. 4, 2017; 8 Pages.

Gardner et al; "Acoustic Telemetry Delivers More Real-Time Downhole Data in Underbalanced Drilling Operations"; Society of Petroleum Engineers; IADC / SPE Drilling Conference; 2006; 3 Pages.

International Search Report and Written Opinion Issued in International Application No. PCT/US2014/030682 dated Aug. 22, 2014; 11 Pages.

International Search Report and Written Opinion Issued in International Application No. PCT/US2014/030831 dated Aug. 25, 2014; 20 Pages.

International Search Report and Written Opinon Issued in International Application No. PCT/US2014/021356 dated Aug. 28, 2014; 14 Pages.

Widrow et al.; "Adaptive Noise Cancelling: Principles and Applications"; Proceedings of the IEEE; vol. 63, No. 12; Dec. 1975; pp. 1692-1717.

\* cited by examiner

ROBUST TELEMETRY REPEATER NETWORK SYSTEM AND METHOD

CROSS-REFERENCE TO RELATED APPLICATIONS

This application is a divisional of U.S. patent application Ser. No. 16/161,955, filed Oct. 16, 2018, which is a continuation of U.S. patent application Ser. No. 14/217,160, filed Mar. 17, 2014, now U.S. Pat. No. 10,103,846 Issued Oct. 16, 2018, which claims priority to U.S. Patent Application Ser. No. 61/799,588 for Robust Network Downhole Telemetry Repeater System and Method, filed Mar. 15, 2013, and is related to U.S. Patent Application Ser. No. 61/731,898 for Downhole Low Rate Linear Repeater Network Timing Control System and Method, filed Nov. 30, 2012, and No. 61/800,063 for High Throughput Downhole Telemetry Network System and Method, filed Mar. 15, 2013. All of these applications are incorporated herein by reference.

BACKGROUND OF THE INVENTION

1. Field of the Invention

The present invention relates generally to telemetry apparatuses and methods, and more particularly to robust networks for downhole telemetry repeater systems and methods for well drilling, production and completion, e.g., in the oil and gas and in other industries.

2. Description of the Related Art

Acoustic telemetry is a method of communication used in well drilling, production and completion. Applications include, but are not limited to, the oil and gas industry. In a typical drilling environment, acoustic extensional carrier waves from an acoustic telemetry device are modulated in order to carry information via the drillpipe as the transmission medium to the surface. Upon arrival at the surface, the waves are detected, decoded and displayed in order that drillers, geologists and others helping steer or control the well are provided with drilling and formation data. In production wells, downhole information can similarly be transmitted via the well casings or production string. Acoustic telemetry transmits data to surface in real-time and is independent of fluid flow, depth, well trajectory and other drilling parameters.

The theory of acoustic telemetry as applied to communication along drillstrings has generally been confirmed by empirical data in the form of accurate measurements. It is now generally recognized that the nearly regular periodic structure of drillpipe imposes a passband/stopband structure on the frequency response, similar to that of a comb filter. Dispersion, phase non-linearity and frequency-dependent attenuation make drillpipe a challenging medium for telemetry, the situation being made even more challenging by the significant surface and downhole noise generally experienced.

Drillstring acoustic telemetry systems are commonly designed with multiple transceiver nodes located at spaced intervals along the drillstring. The nodes can include repeaters. Acoustic telemetry networks can function in synch with the operation of the nodes and repeater nodes and other system components. Data packets consisting of drilling operation data are relayed node to node in a daisy-chain/ linear fashion, typically beginning from a node located in the borehole apparatus (BHA), throughout the network to a destination, usually the surface receiver system. For purposes of minimizing interference between nodes, the data packets are transmitted (typically up-string) using time division multiplexing (TDM) techniques. Maximizing data packet transmission speed and throughput are objectives of drillstring telemetry systems and methods. For a discussion of a repeater network for these applications, see U.S. Patent Application Ser. No. 61/731,898, which is incorporated herein by reference.

When exploring for oil or gas, and in other well drilling, well completion and energy resource production operations, an acoustic transmitter is preferentially placed near the BHA, typically near the drill bit where the transmitter can gather certain drilling and geological formation data, process this data, and then convert the data into a signal to be transmitted, e.g., up-hole or in another direction, to an appropriate receiving and decoding station. In some systems, the transmitter is designed to produce elastic extensional stress waves that propagate through the drillstring to the surface, where the waves are detected by sensors, such as accelerometers, pressure transducers, etc., attached to the drillstring or associated drilling rig equipment. These waves carry information of value to the drillers and others who are responsible for steering the well. Examples of such systems and their components are shown in: Drumheller U.S. Pat. No. 5,128,901 for Acoustic Data Transmission through a Drillstring; Drumheller U.S. Pat. No. 6,791,470 for Reducing Injection Loss in Drill Strings; Camwell et al. U.S. Pat. No. 7,928,861 for Telemetry Wave Detection Apparatus and Method; and Camwell et al. U.S. Pat. No. 8,115,651 for Drill String Telemetry Methods and Apparatus. These patents are incorporated herein by reference.

The link performance within an acoustic repeater network is determined by the signal-to-noise ratio (SNR) and level of channel distortion. The links within a drillstring acoustic network are subject to large variations in channel distortion and noise that cause the occasional loss of signal packets. This loss represents a degradation in the network performance as quantified in average data throughput. The large noise variance means that the network performance remains degraded from full potential, even when average link quality is high. As the number of the nodes increases, the probability of lost packets increases exponentially according to the generalized formula:

$$P_{Success\_Network} = (P_{Success\_Link})^{\#Links}$$

where $P_{Success\_Network}$ is the probability of delivering a packet successfully throughout the network, $PSuccess_{Link}$ is the probability of delivering a packet successfully across a single link in the network, and #Links is the number of inter-node communication links within the network.

Increasing the link SNR, either through increased transmitter power or reduced node spacing, can improve network performance. However, this is costly and lost packets, while reduced, will continue to persist on account of the large variation in noise and distortion.

SUMMARY OF THE INVENTION

In the practice of an aspect of the present invention, a robust network is provided for exploiting the repeater structure of data propagation to avoid problems with transmitting data packets, which can be caused by severe noise and distortion periods. Data packets typically contain sensor or node status data and are transmitted from the primary node (e.g., ST0, typically the deepest node) and relayed from node-to-node in a daisy-chain (linear) fashion to the surface receiver (Surface Rx) 21, which is generally located at or near the wellhead. The data packets include sensor measurements from the BHA 20 and other sensors along the drillstring 12. Such data packet sensor measurements can include, without limitation, wellbore conditions (e.g., annular/bore/differential pressure, fluid flow, vibration, rotation, etc.). Local sensor data can be added to the data packet being relayed at each sensor node, thus providing along-string-measurements (ASMs).

Network operation is typically managed through a time division multiplexing channel management scheme, where node transmissions are scheduled for separate non-overlapping time windows. See U.S. Patent Application Ser. No. 61/800,063 for Increased Throughput Downhole Network Telemetry System and Method, which shows the operation of a repeater scheduling configuration using Time Division Multiplexing (TDM) channel management, and is incorporated herein by reference.

In the practice of an aspect of the present invention, a robust network is provided. Severe noise and distortion periods tend to be relatively short in duration, whereby transmissions subsequent to a failure are likely to succeed. Inter-node link success (e.g., network performance) can be improved through exploiting the time diversity properties of TDM and varying drillstring acoustic environment. For example, transmissions can be repeated in hopes that retransmissions will occur in a more favorable, reduced noise and distortion environment, but this method is relatively inefficient. In the practice of an aspect of the present invention, the repeater structure of data propagation is exploited to increase reception without incurring additional overhead. One solution is therefore utilizing time diversity inherent in the reception of transmissions from adjacent and non-adjacent nodes in a time division multiplexing network for lessening the probability of packet loss. Another solution involves: implicit acknowledgment for the acoustic drillstring channels.

Other objects, advantages and aspects of the present invention will be apparent from the following description. Detailed descriptions of exemplary embodiments are provided in the following sections. However, the invention is not limited to such embodiments.

DETAILED DESCRIPTION OF THE PREFERRED EMBODIMENTS

In the following description, reference is made to "up" and "down" waves, but this is merely for convenience and clarity. It is to be understood that the present invention is not to be limited in this manner to conceptually simple applications in acoustic communication from the downhole end of the drillstring to the surface. It will be readily apparent to one skilled in the art that the present invention applies equally, for example, to subsurface stations, such as would be found in telemetry repeaters, and to other systems.

I. Drilling Rig, Drillstring and Well Environment

Figure 1:
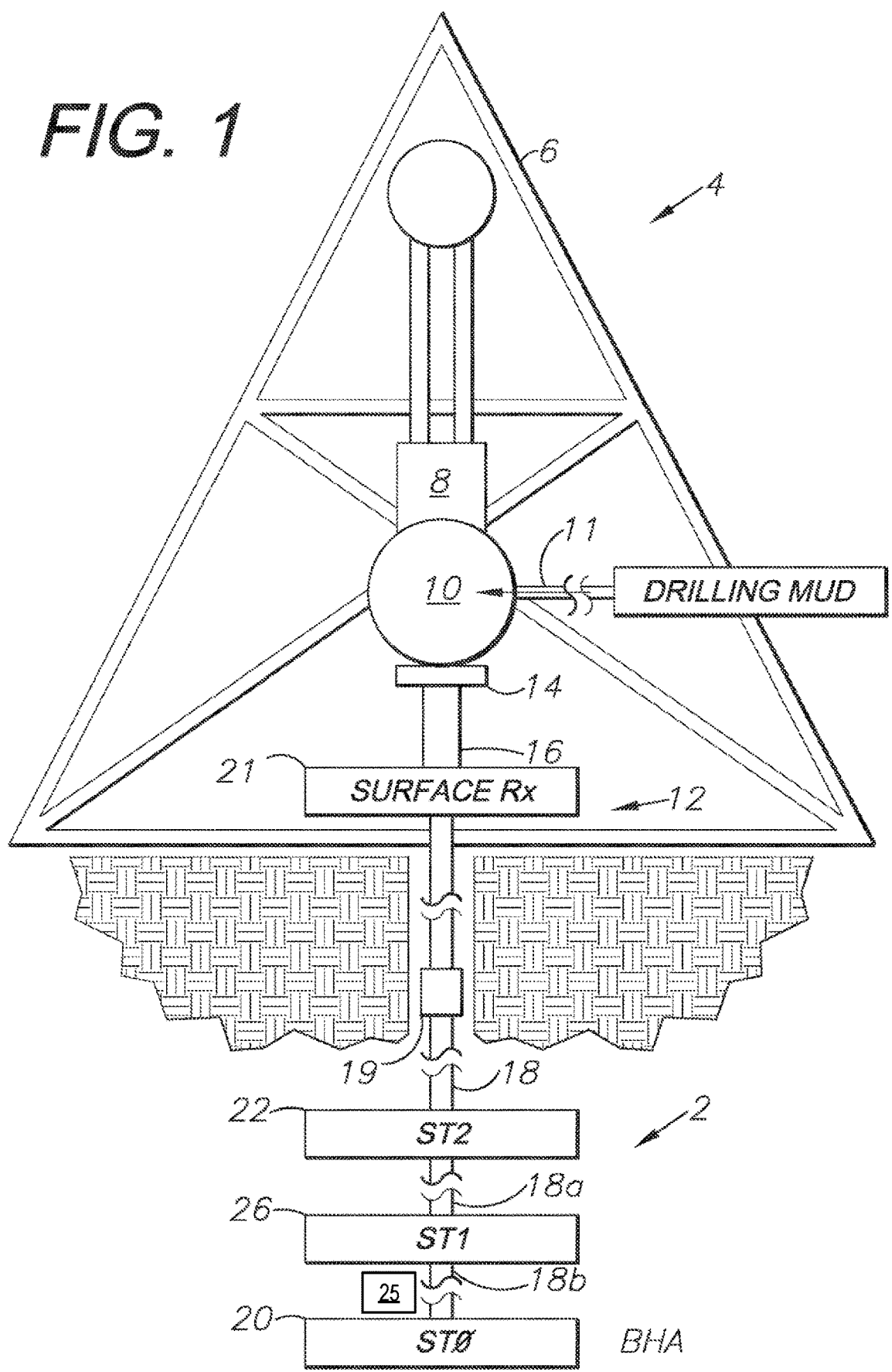
FIG. 1 is a diagram of a typical drilling rig, which can include an acoustic telemetry system, which can be equipped with a robust repeater network embodying an aspect of the present invention.

Referring to the drawings in more detail, the reference numeral 2 generally designates a high throughput repeater system embodying an aspect of the present invention. Without limitation on the generality of useful applications of the system 2, an exemplary application is in a drilling rig 4 (FIG. 1). For example, the rig 4 can include a derrick 6 suspending a traveling block 8 mounting a kelly swivel 10, which receives drilling mud via a kelly hose 11 for pumping downhole into a drillstring 12. The drillstring 12 is rotated by a kelly spinner 14 connected to a kelly pipe 16, which in turn connects to multiple drill pipe sections 18, which are interconnected by tool joints 19, thus forming a drillstring of considerable length, e.g., several kilometers, which can be guided downwardly and/or laterally using well-known techniques.

The drillstring 12 can terminate at or near a bottom-hole apparatus (BHA) 20, which can be at or near an acoustic transceiver node (Primary) Station 0 (ST0). Other rig configurations can likewise employ the present invention, including top-drive, coiled tubing, etc. FIG. 1 also shows the components of the drillstring 12 just above the BHA 20, which can include, without limitation, a repeater transceiver node 26 (ST1) and an additional repeater transceiver node 22 (ST2). An upper, adjacent drillpipe section 18a is connected to the repeater 22 and the transmitter 26. A downhole adjacent drillpipe section 18b is connected to the transmitter 26 and the BHA 20. A surface receiver node 21 is located at the top of the drillstring 12 and is adapted for receiving the acoustic telemetry signals from the system 2 for further processing, e.g., by a processor or other output device for data analysis, recording, monitoring, displaying and other functions associated with a drilling operation.

Figure 2:
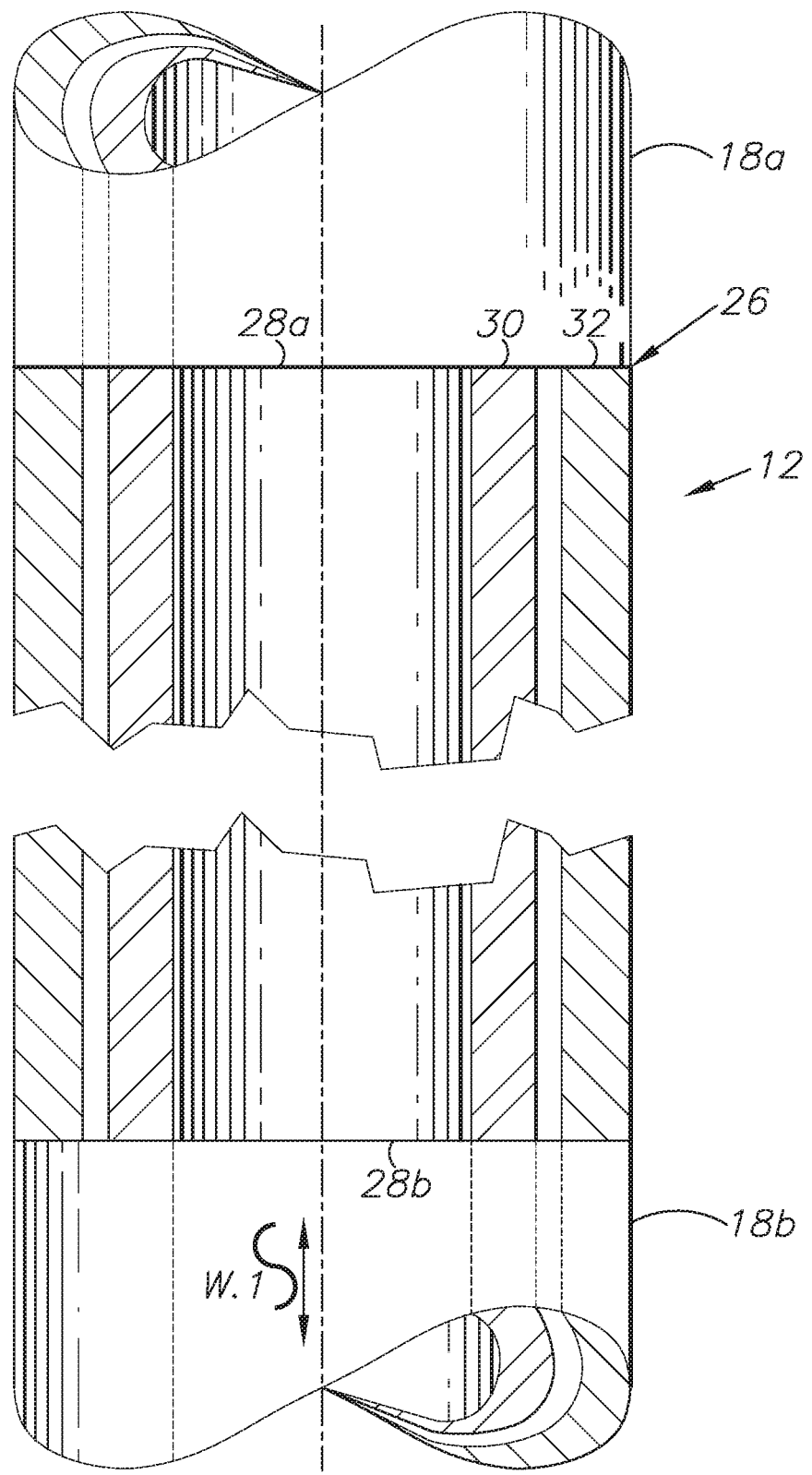
FIG. 2 is a fragmentary, side-elevational and cross-sectional view of a typical drillstring, which can provide the medium for acoustic telemetry transmissions for the present invention.

FIG. 2 shows the internal construction of the drillstring 12, e.g., an inner drillpipe 30 within an outer casing 32. Interfaces 28 a, 28 b are provided for connecting drillpipe sections to each other and to the other drillpipe components, as described above. W.1 illustrates an acoustic, electromagnetic or other energy waveform transmitted along the drillstring 12, either upwardly or downwardly. The drillstring 12 can include multiple additional repeaters 22 at intervals determined by operating parameters such as optimizing signal transmissions with minimal delays and errors. The drillstring 12 can also include multiple sensors (e.g., a sensor 25) along its length for producing output signals corresponding to various downhole conditions.

Data packets contain sensor or node status data and are transmitted from the primary node (e.g., ST0, typically the deepest node) and relayed from node-to-node to the surface receiver (Surface Rx) 21, which is generally located at or near the wellhead. The data packets include sensor measurements from the BHA 20 and other sensors along the drillstring 12. Such data packet sensor measurements can include, without limitation, wellbore conditions (e.g., annular/bore/differential pressure, fluid flow, vibration, rotation, etc.). Local sensor data can be added to the data packet being relayed at each sensor node, thus providing along-string-measurements (ASMs).

A single node functions as the master node (e.g., ST0) and is typically an edge node at the top or bottom of the drillstring 12. The master node monitors well conditions and sends data packets of varying type and intervals accordingly.

As noted above, network performance problems are associated with lost data packets, which can be caused by SNR and channel distortion variances and are compounded with increasing numbers of nodes within the network.

II. Solution 1: Exploiting Relay Network Time Diversity

Figure 3:
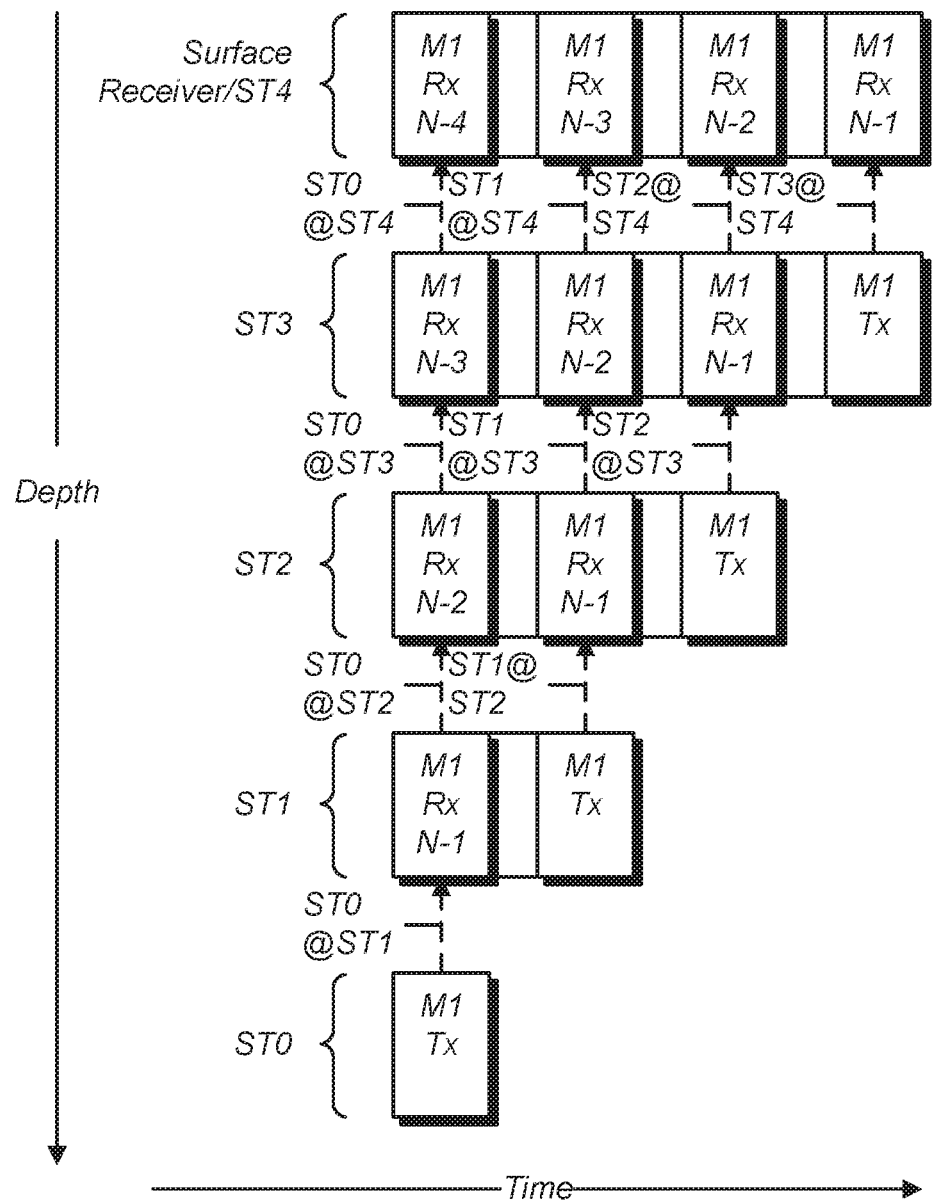
FIG. 3 is a schematic diagram of a system with nodes redundantly receiving messages multiple times for improved network robustness and performance.

As the acoustic drillstring channel is bidirectional and the acoustic transmitter can be configured to be bi-directional, transmissions of a node will propagate both uphole and downhole. The repeater structure of data propagation can be exploited to increase perceived attempts with no additional overhead. FIG. 3 shows a system configuration whereby nodes will "hear" the transmissions of both adjacent ("N+/−1") as well as non-adjacent nodes ("N+/−2", "N+/−3", etc.) Nodes can benefit from the time diversity associated with the reception of transmissions originating from adjacent and non-adjacent nodes, thus lessening the probability of packet loss due to short-term noise/channel events.

A node will have multiple receipts of the same message, with varying quality, and can: 1) choose the resulting data of best quality to be relayed; or 2) coherently combine the signals to enhance the SNR and recover higher quality data for relaying. The quality of received data can be determined through SNR and other waveform quality measures of the received packets, and/or the results from signal detection and error correction algorithms (e.g., CRC, Hamming, convolutional encoding, etc.).

This system adds redundancy into the system, improving robustness by automatically bridging intermittent or failed nodes, by recovering data and network timing from the reception of non-adjacent transmissions, without the need for inter-node control signaling or other inefficient overhead. Network robustness can therefore be increased with the addition of nodes. This system is applicable to both upward (uplink) and downward (downlink) directional networks, and is further applicable to EM repeater networks as well as acoustic networks.

III. Implicit Acknowledgment

Figure 4:
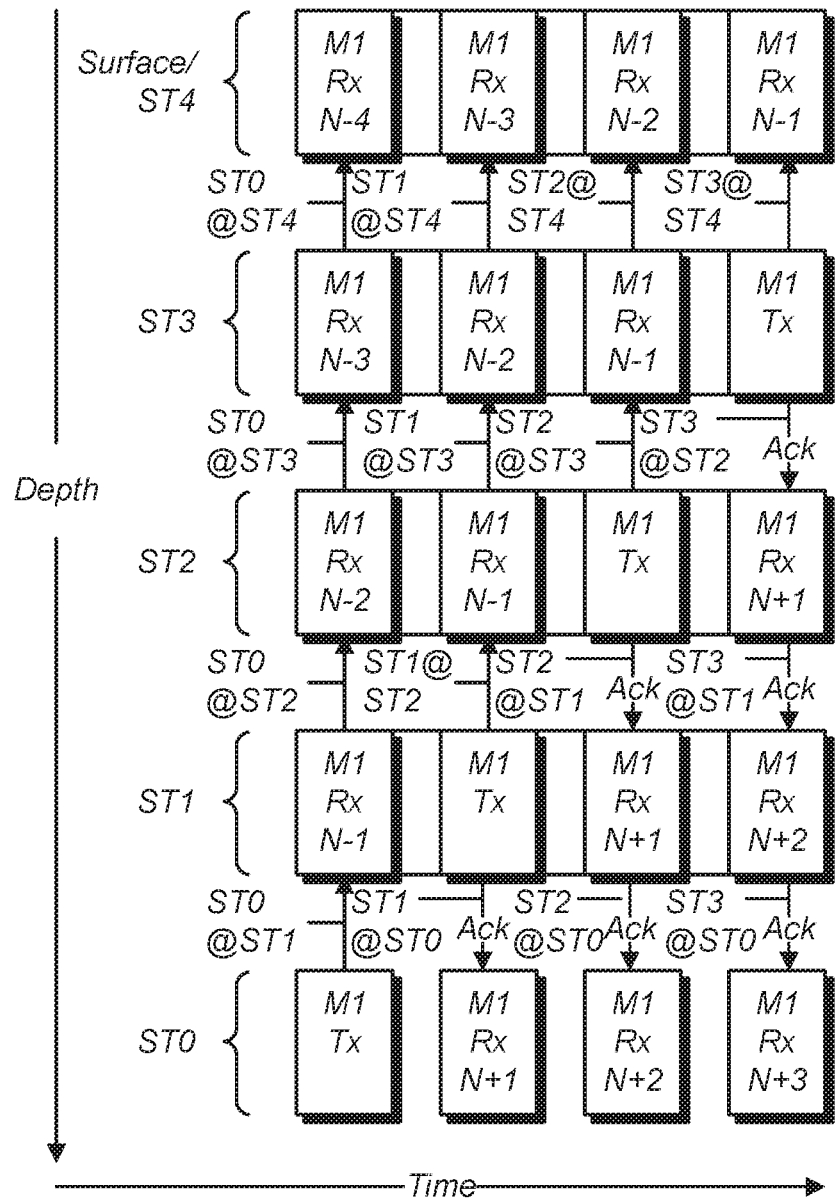
FIG. 4 is a schematic diagram of a system using implicit acknowledgment with an acoustic drillstring channel and an acoustic tool, both of which are bidirectional.

FIG. 4 shows an alternative aspect of the present invention using implicit acknowledgment and bidirectional transmissions. As the acoustic drillstring channel is bidirectional and the acoustic transmitter can be configured to be bidirectional, node transmissions will propagate both uphole and downhole. A node within an acoustic network will therefore hear the relay transmission of the above node(s). If a node is configured to only transmit in response to a successfully received packet, receiving the "relay" transmission from the destination node will be therefore an implicit acknowledgment ("Ack") of a successful link relay. If the relay is not "heard," the originating node can re-transmit until an implicit Ack is received, indicating successful receipt. This is useful in the case of critical data packets such as control/error/configuration/alarm packets. Alternatively, the originating node can gather statistical information on the link success rate (e.g., percentage of successful transmissions) and accordingly take one or more actions to improve network performance, conserve battery power, or increase data rate: e.g., altering transmit power; altering baud rate; altering modulation; and/or altering frequency.

This method is passive in nature and requires no channel resources other than those required in the re-transmission. The onus for reliability is on the transmitting node, rather than the receiving node, removing the challenging problem of detecting a missed message within a network propagating unpredictable messages types. Should the surface, or edge node be configured to or not capable of repeating, the adjacent node in the network will not receive implicit Acks. To handle this case, the system can be designed such that the adaptive link is enabled only upon receipt of implicit Acks, indicating there it is no longer the last link. Nodes are inserted into the drillstring as the drillstring is lowered into the wellbore ("tripping in"), nodes will be inserted before signal is completely lost, ensuring that Acks are received. The implicit acknowledgment system is applicable to both upward (uplink) and downward (downlink) directional networks, and is also applicable to EM repeater networks as well as acoustic networks.

In addition to providing feedback of successful link transmission, the relay transmission can be further exploited to provide an efficient measure of the inter-node acoustic channel to the transmitter. The received relay transmission is largely composed of known data, having been previously originated by the transmitter, which can be exploited to derive a measure of the channel response (e.g. frequency response). As the acoustic channel is reciprocal in nature, this channel measure information can be used to optimize transmission parameters to further improve link robustness, throughput and efficiency. Transmission parameters would include: total transmit power, transmit power allocation across frequency (pre-equalization), baud rate, modulation, and error correction scheme. This method is of particular value to multi-carrier modulation schemes, such as OFDM, in which channel measure information can be used to maximize bandwidth usage through subcarrier power allocation and subcarrier modulation order.

The implicit channel measure method is applicable to both upward (uplink) and downward (downlink) directional networks, and is also applicable to EM repeater networks as well as acoustic networks.

IV. Bidirectional Network

Figure 5A:
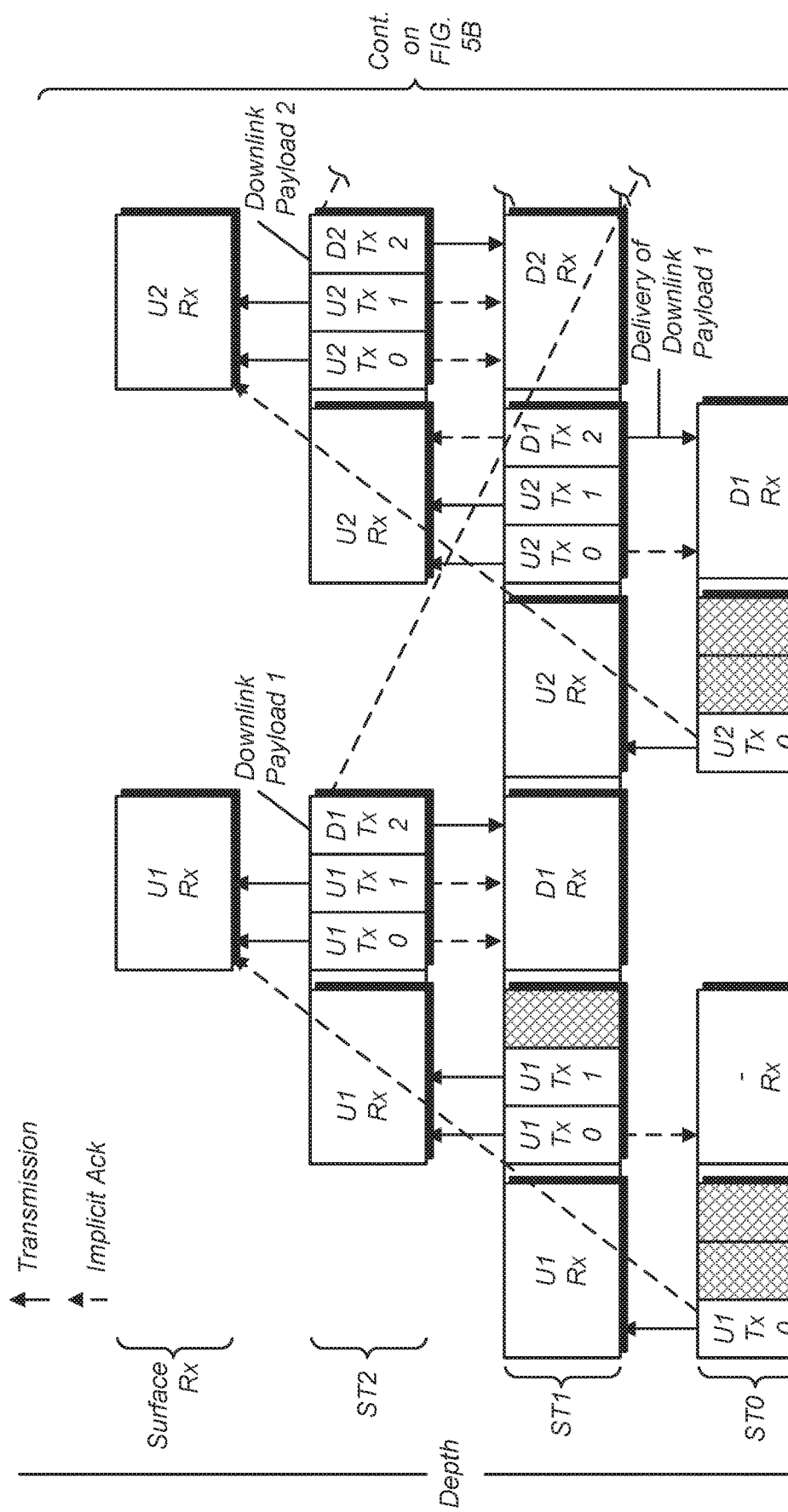
FIGS. 5A and 5B show a schematic diagram of a bidirectional network using implicit acknowledgment.
Figure 5B:
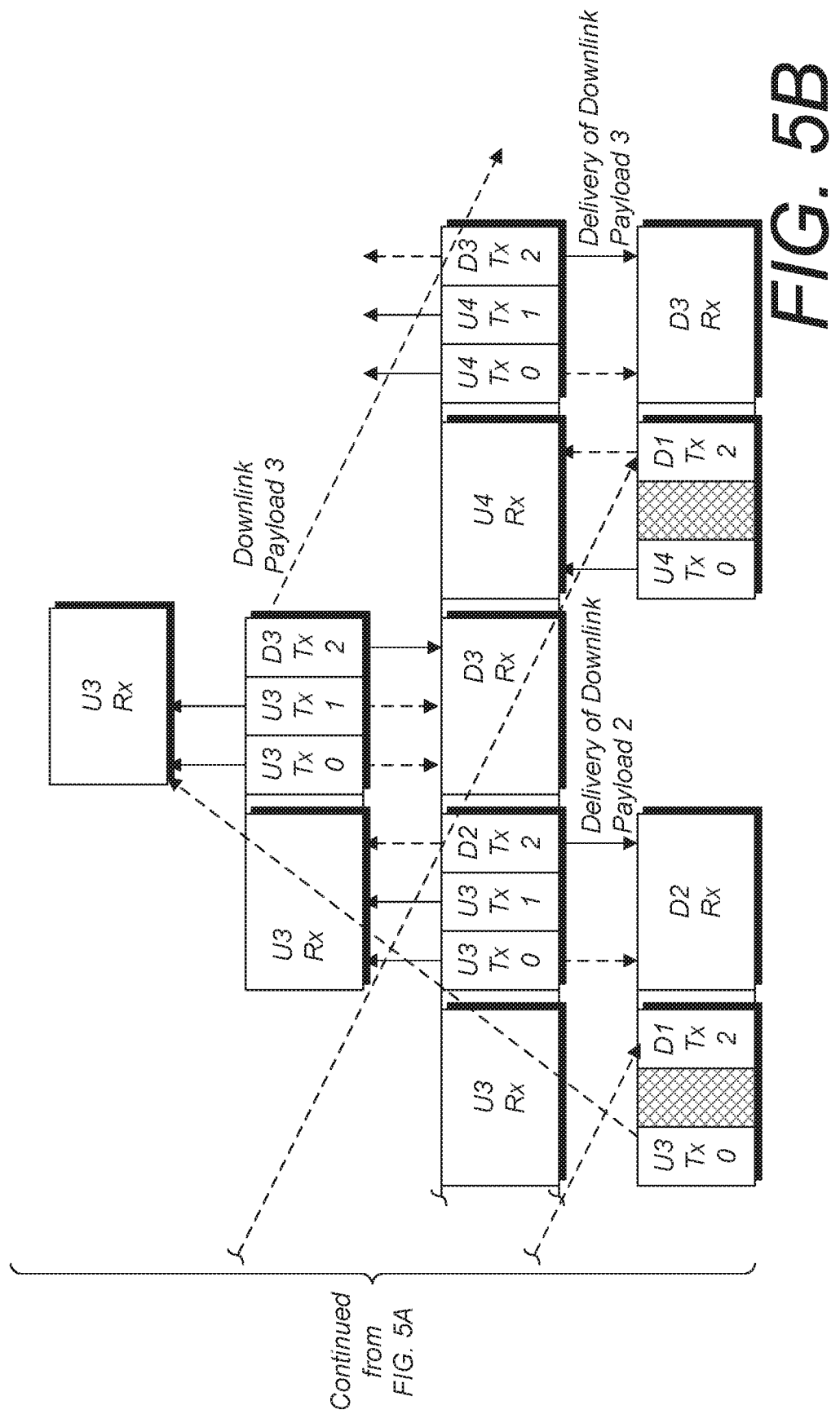

FIGS. 5A and 5B show a bidirectional network, which can optionally utilize the implicit acknowledgment configurations and techniques described above. The bidirectional network shown in FIGS. 5A and 5B exploits the inherent bidirectional transmission of signals transmitted on a drillstring or other structure. Payloads are prefixed with "U" for propagation upwards to surface (uplink), and prefixed with "D" for propagation downwards (downlink). Utilizing implicit acknowledgment, successful link relays can be acknowledged via Acks on the bidirectional network, similar to the previously described uplink only configurations. More specifically, for every uplink traversal through the full network (packet/update delivered to surface), a downlink-allocated payload traverses a single node link, i.e., high-latency downlink+low-latency uplink/low-latency downlink+high-latency uplink. Bidirectional network action can thus be protected. Moreover, robustness and reliability of the network can be increased without adding additional overhead.

V. Bidirectional Network: Status

Figure 6:
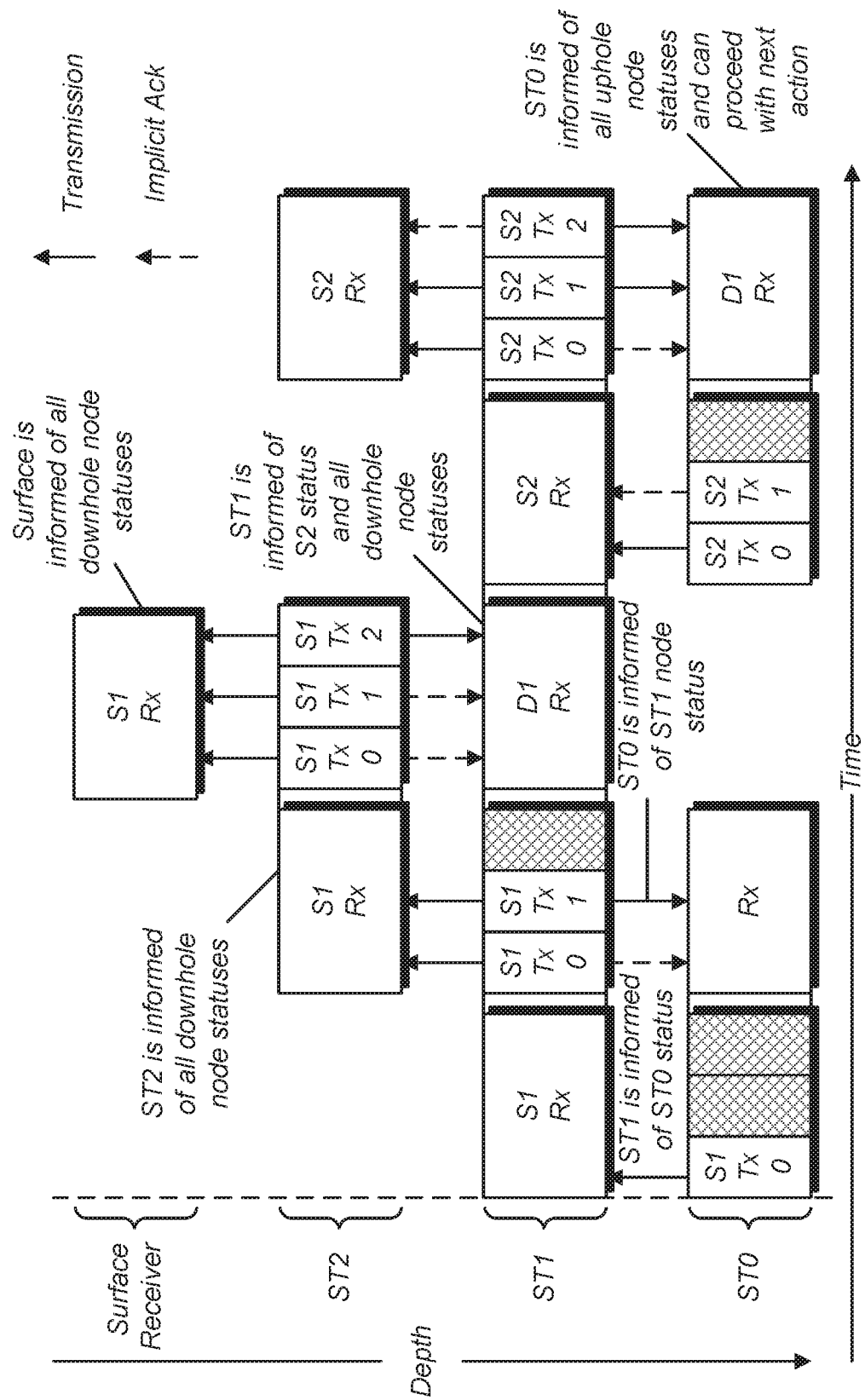
FIG. 6 is a schematic diagram of a bidirectional network wherein all nodes are informed of the status of all other nodes (possibly for reliable confirmation of network configuration change command prior to transitioning between incompatible network configurations, alleviating a risk of lost nodes).

FIG. 6 shows an alternative aspect of the present invention with a bidirectional network status configuration whereby bidirectional action can provide a mechanism for all nodes in the network to know the status of all of the nodes. Payload can be added by every node, and can include data and/or status. Data packet space can be allocated for a status indication for each node in the network. This status payload is labeled in FIG. 6 with an "S" prefix. ST0 would relay its status to ST1, where ST1 would relay ST1's status along with its own status to the higher node, which in turn would do the same. The ST1 packet however is also received downhole by ST0 on account of the bidirectional nature of the transmitter and channel, enabling ST0 to receive the status of ST1. Subsequent network updates to surface, higher station status would eventually be relayed down to the lower stations. All nodes are thereby informed that all of the status of all other nodes. This provides a means to provide confirmation of receipt throughout the network. One such application being the reliable transition of the network between incompatible network configurations with a downlink command from surface. In this application, a transition would only be initiated once all nodes have received indication that all other nodes have received a command. Without the proposed scheme, a node failure to receive the transition command would result in the loss of a node, degraded network performance or complete network failure.

It is to be understood that the invention can be embodied in various forms, and is not to be limited to the examples discussed above. The range of components and configurations which can be utilized in the practice of the present invention is virtually unlimited.

What is claimed is:

1. A telemetry repeater network system, which includes:
   multiple network nodes receiving and transmitting acoustic data bi-directionally, wherein at least one of the multiple network nodes is disposed in a wellbore, wherein at least one of the multiple network nodes acts as an originating node, and wherein at least one of the multiple network nodes acts as a destination node;
   a sensor associated with one or more of said multiple network nodes and providing output comprising signal data packets; and
   the originating node determining successful reception by the destination node via the successful reception of a subsequent relay packet of the destination node, creating an implicit acknowledgement (Ack) of successful data packet reception.

2. The telemetry network system according to claim 1, which includes the originating node retransmitting a data packet until an implicit Ack is received, guaranteeing successful receipt.

3. The telemetry network system according to claim 1, which includes:
   formation of adaptive link management through one of multiple originating nodes gathering statistical information on a link success rate; and
   the one of the multiple originating nodes taking one or more of the following actions to improve link robustness, conserve battery power or increase data rate; altering transmit power; altering baud rate; altering modulation; altering error correction scheme; altering frequency; altering transmission medium; and altering power allocation or modulation or error correction as a function of frequency or subcarrier.

4. The telemetry network system according to claim 3, which includes:
   the link success rate comprising a percentage of successful transmissions or a ratio of successful to unsuccessful transmissions a function of time.

5. The telemetry network system according to claim 3, wherein said adaptive link management is without explicit control/feedback signaling that consumes channel resources.

6. The telemetry network system according to claim 3, wherein:
   an adjacent node to the destination node in the network does not receive an implicit Ack;
   an adaptive link is enabled only upon receipt of the implicit Ack, indicating that it is no longer a last link; and
   in a case of an expanding network, nodes being added to the network before signal is lost, ensuring that Acks are received.

7. The telemetry network system according to claim 1, which is applicable to downhole drillstring networks comprising:
   an uplink network, a downlink network, or a bidirectional network.

8. The telemetry network system according to claim 1, wherein said relay transmission provides a means to make channel measures at the originating node without using additional channel resources or system overhead.

9. The telemetry network system according to claim 8, which includes the formation of adaptive link management through one of multiple originating nodes gathering channel information; and one of the multiple originating nodes taking one or more of the following actions to improve link robustness, improve net link data throughput, conserve battery power, or increase data rate: altering transmit power altering baud rate; altering modulation; altering error correction scheme; altering frequency; altering transmission medium; and altering power allocation or modulation or error correction as function of frequency or subcarrier.

10. The telemetry network system according to claim 9, wherein the channel measures are further enabled through inclusion of a known signal within relay packets.

* * * * *